United States Patent
Ishikura

(10) Patent No.: US 11,987,007 B2
(45) Date of Patent: May 21, 2024

(54) THREE-DIMENSIONAL SHAPING DEVICE AND THREE-DIMENSIONAL SHAPING SYSTEM

(71) Applicant: SEIKO EPSON CORPORATION, Tokyo (JP)

(72) Inventor: Keigo Ishikura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 378 days.

(21) Appl. No.: 17/456,407

(22) Filed: Nov. 24, 2021

(65) Prior Publication Data

US 2022/0161501 A1 May 26, 2022

(30) Foreign Application Priority Data

Nov. 26, 2020 (JP) ................................. 2020-195608

(51) Int. Cl.
*B29C 64/393* (2017.01)
*B29C 64/209* (2017.01)
(Continued)

(52) U.S. Cl.
CPC .......... *B29C 64/393* (2017.08); *B29C 64/209* (2017.08); *B29C 64/314* (2017.08);
(Continued)

(58) Field of Classification Search
CPC .............. E04F 13/0826; E04F 13/0894; E04F 2201/0153; E04F 2201/023; E04F 19/062
See application file for complete search history.

(56) References Cited

U.S. PATENT DOCUMENTS

| | | | |
|---|---|---|---|
| 2004/0162629 A1* | 8/2004 | Kondou | G05B 19/4099 700/166 |
| 2016/0288415 A1* | 10/2016 | Fromm | B29C 64/295 |

(Continued)

FOREIGN PATENT DOCUMENTS

| | | | |
|---|---|---|---|
| JP | 2003-087632 A | 3/2003 | |
| JP | 2004-106524 | * 4/2004 | ................ B22F 3/00 |

(Continued)

*Primary Examiner* — Amara Abdi
(74) *Attorney, Agent, or Firm* — Global IP Counselors, LLP

(57) ABSTRACT

A three-dimensional shaping device includes: a discharge unit configured to discharge a plasticized material toward a shaping region of a stage; a camera configured to capture an image of the shaping region; and a control unit configured to control the discharge unit based on shaping data for shaping a three-dimensional shaped object. When the control unit acquires setting information for setting whether to display an image or a moving image captured by the camera on an external display unit in at least one of a period before starting shaping of the three-dimensional shaped object, a period during shaping of the three-dimensional shaped object, and a period after shaping of the three-dimensional shaped object, the control unit executes, based on the setting information, for each of the shaping data, first processing of transmitting or not transmitting the image or the moving image to the display unit, second processing of activating or stopping the camera, and third processing of transmitting, to the display unit, output instruction information for instructing whether to display the image or the moving image on the display unit.

10 Claims, 14 Drawing Sheets

(51) Int. Cl.
*B29C 64/314* (2017.01)
*B33Y 30/00* (2015.01)
*B33Y 40/10* (2020.01)
*B33Y 50/02* (2015.01)
*G06T 7/00* (2017.01)
*B29C 64/118* (2017.01)

(52) U.S. Cl.
CPC .............. *B33Y 30/00* (2014.12); *B33Y 40/10* (2020.01); *B33Y 50/02* (2014.12); *G06T 7/0004* (2013.01); *B29C 64/118* (2017.08); *G06T 2207/30164* (2013.01)

(56) References Cited

U.S. PATENT DOCUMENTS

2017/0153858 A1* 6/2017 Sato ...................... G06F 3/1208
2017/0173888 A1 6/2017 Thomas-Lepore et al.
2017/0173889 A1* 6/2017 Thomas-Lepore ... H04L 51/046
2017/0348901 A1* 12/2017 Hara ...................... B33Y 50/02
2021/0154910 A1* 5/2021 Cheng .................. B29C 64/209

FOREIGN PATENT DOCUMENTS

| JP | 2004-106524 A | 4/2004 | | |
| JP | 2015-507250 A | 3/2015 | | |
| JP | 2016-062555 A | 4/2016 | | |
| JP | 2016-062556 A | 4/2016 | | |
| JP | 2017-094692 A | 6/2017 | | |
| JP | 2020-097121 A | 6/2020 | | |
| JP | 2020097121 | * | 6/2020 | .......... B29C 64/106 |
| JP | 2020-124828 | * | 8/2020 | .......... B29C 64/386 |
| JP | 2020-124828 A | 8/2020 | | |
| WO | 2013/086309 A1 | 6/2013 | | |
| WO | 2018/174338 A1 | 9/2018 | | |
| WO | WO 2018/174338 | * | 9/2018 | ............. B29C 67/00 |

* cited by examiner

*FIG. 6*

| SHAPING DATA ID | USER INFORMATION | |
|---|---|---|
| data01 | user01/password01 | DB1 |
| | user02/password02 | |
| | user03/password03 | |
| | user04/password04 | |
| | user05/password05 | |

⋮

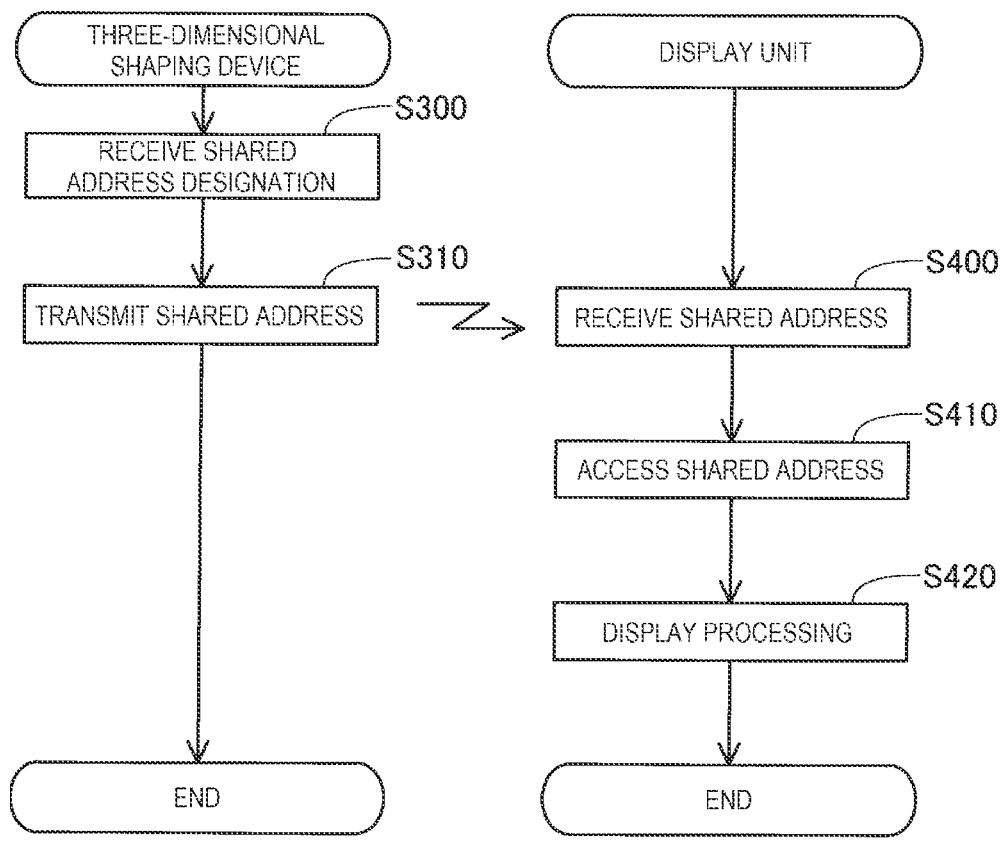

THREE-DIMENSIONAL SHAPING DEVICE AND THREE-DIMENSIONAL SHAPING SYSTEM

The present application is based on, and claims priority from JP Application Serial Number 2020-195608, filed Nov. 26, 2020, the disclosure of which is hereby incorporated by reference herein in its entirety.

BACKGROUND

1. Technical Field

The present disclosure relates to a three-dimensional shaping device and a three-dimensional shaping system.

2. Related Art

JP-T-2015-507250 discloses a three-dimensional shaping device including a video camera. The three-dimensional shaping device can capture an image of a shaped object during shaping by the video camera and transmit the image to a distant location.

In a case where the three-dimensional shaping device is shared by a plurality of users, when the image of the shaped object captured by the video camera is transmitted to the distant location as described above, another user may be in a state where the shaped object of the current user can be visually recognized. Therefore, when a plurality of persons share the three-dimensional shaping device, it is difficult to shape a confidential shaped object.

SUMMARY

The present disclosure can be implemented in the following aspects.

According to a first aspect of the present disclosure, a three-dimensional shaping device is provided. The three-dimensional shaping device includes: a discharge unit including a plasticizing mechanism which plasticizes at least a part of a material and configured to discharge the plasticized material toward a shaping region of a stage; a camera configured to capture an image of the shaping region; and a control unit configured to control the discharge unit based on shaping data for shaping a three-dimensional shaped object. When the control unit acquires setting information for setting whether to display an image or a moving image captured by the camera on an external display unit in at least one of a period before starting shaping of the three-dimensional shaped object, a period during shaping of the three-dimensional shaped object, and a period after shaping of the three-dimensional shaped object, the control unit executes, based on the setting information, for each of the shaping data, first processing of transmitting or not transmitting the image or the moving image to the display unit, second processing of activating or stopping the camera, and third processing of transmitting, to the display unit, output instruction information instructing whether to display the image or the moving image on the display unit.

According to a second aspect of the present disclosure, a three-dimensional shaping system including a three-dimensional shaping device and a display device is provided. In the three-dimensional shaping system, the three-dimensional shaping device includes a discharge unit including a plasticizing mechanism which plasticizes at least a part of a material and configured to discharge the plasticized material toward a shaping region of a stage, a camera configured to capture an image of the shaping region, and a control unit configured to control the discharge unit based on shaping data for shaping a three-dimensional shaped object. When the control unit acquires setting information for setting whether to display an image or a moving image captured by the camera on the display device in at least one of a period before starting shaping of the three-dimensional shaped object, a period during shaping of the three-dimensional shaped object, and a period after shaping of the three-dimensional shaped object, the control unit executes, based on the setting information, for each of the shaping data, first processing of transmitting or not transmitting the image or the moving image to the display device, second processing of activating or stopping the camera, and third processing of transmitting, to the display device, output instruction information instructing whether to display the image or the moving image on the display device.

BRIEF DESCRIPTION OF THE DRAWINGS

FIG. 6 is a diagram showing a data structure of a first user information database.

FIG. 8 is a diagram showing a data structure of a second user information database.

FIG. 9 is a flowchart of image output processing according to a third embodiment.

DESCRIPTION OF EXEMPLARY EMBODIMENTS

A. First Embodiment

Figure 1:
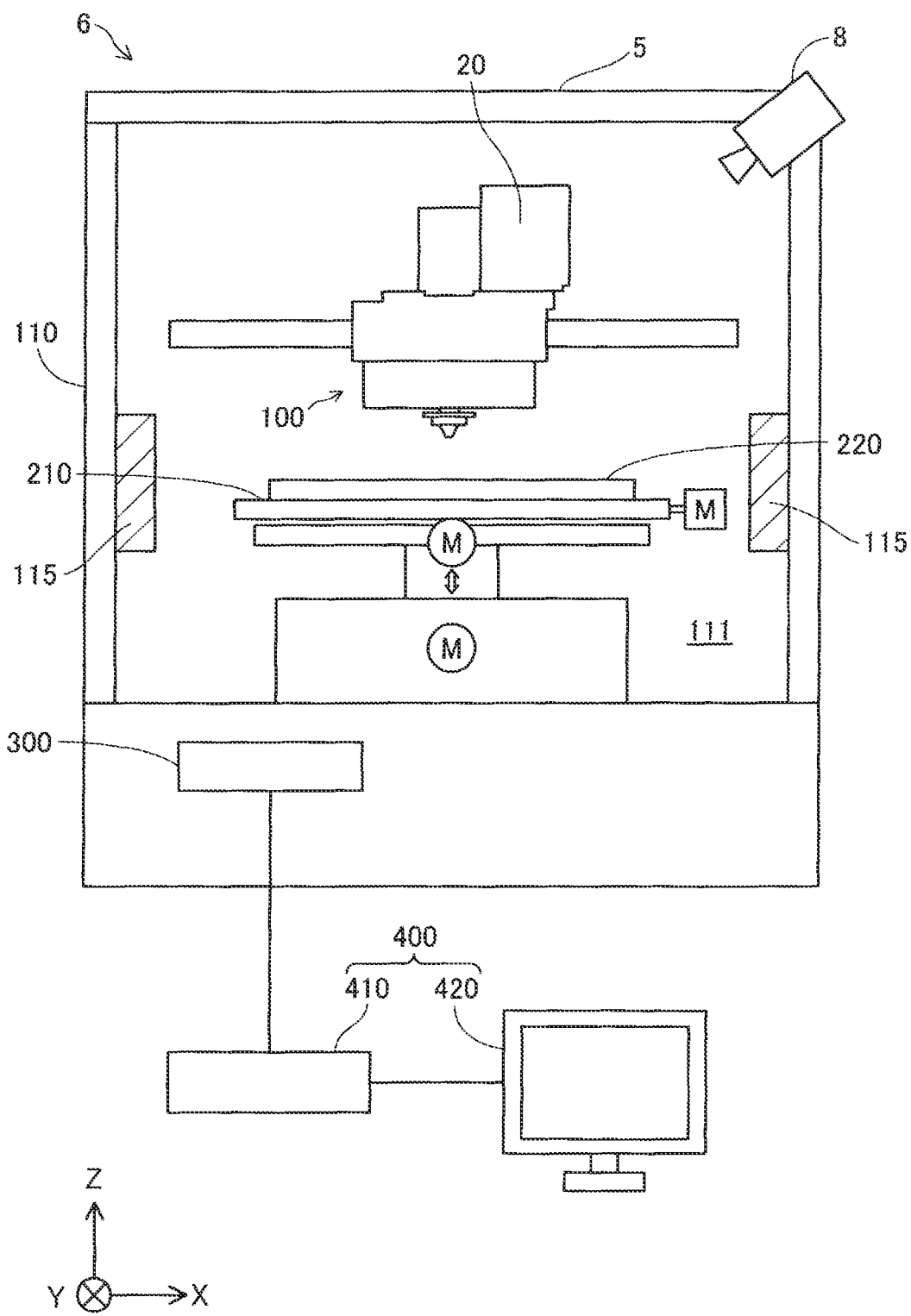
FIG. 1 is a diagram showing a schematic configuration of a three-dimensional shaping system.

FIG. 1 is a diagram showing a schematic configuration of a three-dimensional shaping system 6 including a three-dimensional shaping device 5 according to a first embodiment. The three-dimensional shaping system 6 includes the three-dimensional shaping device 5 and a display device 400. FIG. 1 shows arrows along X, Y, and Z directions which are orthogonal to one another. The X, Y, and Z directions are directions along an X axis, a Y axis, and a Z axis, which are three spatial axes orthogonal to one another, and each include a direction on one side along the X axis, the Y axis, and the Z axis and a direction opposite thereto. The X axis and the Y axis are axes along a horizontal plane, and the Z axis is an axis along a vertical line. The other figures also show arrows along the X, Y, and Z directions as appropriate. The X, Y, and Z directions in FIG. 1 and the X, Y, and Z directions in other figures represent the same directions.

The three-dimensional shaping device 5 according to the present embodiment includes a discharge unit 100, a material accommodation unit 20, a chamber 110, a movement mechanism 210, a stage 220, and a control unit 300.

The discharge unit 100 includes a plasticizing mechanism that plasticizes at least a part of the material supplied from the material accommodation unit 20. The discharge unit 100 discharges the plasticized material toward a shaping region of the stage 220. The shaping region is a region on an upper surface of the stage 220.

The chamber 110 is a housing that has a shaping space 111 therein and accommodates a part of the three-dimensional shaping device 5. In the present embodiment, the material accommodation unit 20, the discharge unit 100, the movement mechanism 210, and the stage 220 are accommodated in the shaping space 111. The chamber 110 may be provided with, for example, an opening that allows the shaping space and the outside to communicate with each other, or a door that opens and closes the opening. In this case, a user can take out a shaped object in the chamber 110 through the opening by opening the door and opening the opening.

A chamber heating unit 115 is provided in the chamber 110. The chamber heating unit 115 heats the shaping space 111 in the chamber 110. The chamber heating unit 115 may be implemented by, for example, a heater that heats the inside of the chamber 110, or may be implemented by a circulation device that circulates air inside and outside the chamber 110 while taking in the heated air from the outside of the chamber 110. The chamber heating unit 115 according to the present embodiment is controlled by the control unit 300. For example, the control unit 300 adjusts a temperature in the chamber 110 by adjusting an output of the chamber heating unit 115 while referring to a temperature acquired by a temperature sensor which is not shown. In another embodiment, the chamber 110 and the chamber heating unit 115 may not be provided in the three-dimensional shaping device 5.

The movement mechanism 210 changes a relative position between the discharge unit 100 and the stage 220. In the present embodiment, the movement mechanism 210 moves the stage 220 with respect to the discharge unit 100. A change in the relative position of the discharge unit 100 with respect to the stage 220 may be simply referred to as movement of the discharge unit 100. The movement mechanism 210 in the present embodiment is implemented by a three-axis positioner that moves the stage 220 in three axial directions of the X, Y, and Z directions by driving forces of three motors. Each motor is driven under the control of the control unit 300. In another embodiment, the movement mechanism 210 may be implemented, for example, to move the discharge unit 100 without moving the stage 220 instead of moving the stage 220. The movement mechanism 210 may be implemented to move both the stage 220 and the discharge unit 100.

The control unit 300 is implemented by a computer including one or more processors, a memory, and an input and output interface that inputs and outputs signals to and from the outside. In the present embodiment, the control unit 300 controls the discharge unit 100 based on shaping data for shaping the three-dimensional shaped object by the processor executing a program and a command read into the memory, so as to execute three-dimensional shaping processing. The control unit 300 may be implemented by a combination of a plurality of circuits instead of a computer.

The three-dimensional shaping device 5 according to the present embodiment further includes a camera 8. The camera 8 can capture an image of the shaping region on the stage 220. The camera 8 is controlled by the control unit 300. The control unit 300 can control the camera 8 to capture an image or a moving image of the shaping region. Hereinafter, the image and the moving image are collectively referred to as an "image". In the present embodiment, the camera 8 is always activated while the three-dimensional shaping device 5 is activated. That is, the camera 8 always captures the image while the three-dimensional shaping device 5 is activated.

An external display device 400 is coupled to the control unit 300. The display device 400 includes a computer 410 and a display unit 420. As the display unit 420, for example, a liquid crystal display or an organic EL display is used. The computer 410 and the display unit 420 may be separated from each other or may be integrated with each other. In the present embodiment, the control unit 300 and the computer 410 are coupled via a network. The network may be any of a LAN, a WAN, and the Internet. The computer 410 has a function of transmitting the shaping data for shaping the three-dimensional shaped object to the three-dimensional shaping device 5. The control unit 300 of the three-dimensional shaping device 5 receives the shaping data from the computer 410, and performs three-dimensional shaping based on the received shaping data. The processing in which the control unit 300 shapes the three-dimensional shaped object in accordance with one piece of shaping data is referred to as a "print job". The display device 400 is not limited to a combination of the computer 410 and the display unit 420, and may be a notebook computer, a mobile terminal, or a tablet device. Although FIG. 1 shows one display device 400, a plurality of display devices 400 may be coupled to the three-dimensional shaping device 5 via a network.

The computer 410 acquires, from a user, setting information indicating whether the image captured by the camera 8 provided in the three-dimensional shaping device 5 is to be displayed on the display device 400. The user can input the setting information, for example, by using a predetermined graphical user interface displayed on the display unit 420. The control unit 300 of the three-dimensional shaping device 5 acquires the setting information from the computer 410. For example, the control unit 300 acquires, from the computer 410, the setting information input by the user who outputs the shaping data to the three-dimensional shaping device 5. Then, based on the setting information, image display processing is performed on the display device 400 for each shaping data. In the present embodiment, the control unit 300 can set whether to display the image captured by the camera 8 on the external display device 400 in at least one period before starting shaping of the three-dimensional shaped object, during shaping of the three-dimensional shaped object, and after shaping of the three-dimensional shaped object.

Figure 2:
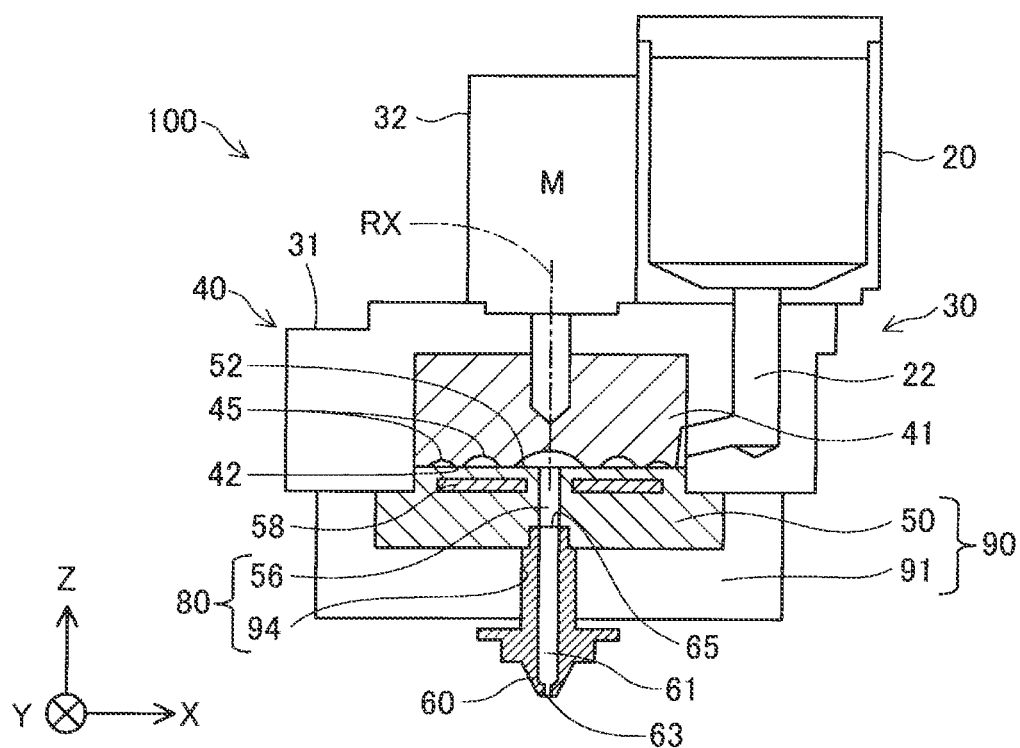
FIG. 2 is a diagram showing a schematic configuration of a discharge unit.

FIG. 2 is a diagram showing a schematic configuration of the discharge unit 100 according to the present embodiment. The discharge unit 100 includes the plasticizing mechanism 30 and a nozzle tip 60. The plasticizing mechanism 30 includes a material conveying mechanism 40 and a heating block 90. The material accommodated in the material accommodation unit 20 is supplied to the discharge unit 100. Under the control of the control unit 300, the discharge unit 100 causes the plasticizing mechanism 30 to plasticize at least a part of the material supplied from the material accommodation unit 20 to generate a plasticized material, and discharges the generated plasticized material from the nozzle tip 60 onto the stage 220 to stack the plasticized material. The material stacked on the stage 220 may be referred to as a stacked material. In addition, a three-dimensional shaping method in which a material is discharged from a nozzle and the discharged material is stacked to shape the three-dimensional shaped object may be referred to as a material extrusion (ME) method.

In the present embodiment, the term "plasticization" means that the heat is applied to a thermoplastic material to melt the material. The term "melt" means not only that the thermoplastic material is heated to a temperature equal to or higher than a melting point to be liquefied, but also that the thermoplastic material is heated to a temperature equal to or higher than a glass transition point to be softened, thereby exhibiting the fluidity.

In the material accommodation unit 20 according to the present embodiment, a material in a state of pellets, powder, or the like is accommodated. In the present embodiment, the material accommodated in the material accommodation unit 20 is a pellet-shaped resin. The material accommodation unit 20 according to the present embodiment is implemented by a hopper. The material accommodated in the material accommodation unit 20 is supplied to the material conveying mechanism 40 of the plasticizing mechanism 30 of the discharge unit 100 via a supply path 22 provided below the material accommodation unit 20 so as to couple the material accommodation unit 20 and the discharge unit 100.

The heating block 90 includes a heater 58. The heating block 90 is provided with a through hole 80. The through hole 80 is implemented such that the nozzle tip 60 can be attached to and detached from the through hole 80. The material conveying mechanism 40 conveys the material toward a nozzle flow path 61 of the nozzle tip 60 attached to the through hole 80 of the heating block 90. The plasticizing mechanism 30 conveys the material supplied from the material accommodation unit 20 to the material conveying mechanism 40 toward the nozzle flow path 61 of the nozzle tip 60 by the material conveying mechanism 40, and heats and plasticizes the material by the heat of the heating block 90.

The material conveying mechanism 40 according to the present embodiment includes a screw case 31, a screw 41 accommodated in the screw case 31, and a drive motor 32 that drives the screw 41. The heating block 90 according to the present embodiment includes a case portion 91 having an opening 94, and a barrel 50 disposed in the case portion 91. The barrel 50 is provided with a communication hole 56. The through hole 80 according to the present embodiment is formed by the opening 94 and the communication hole 56 communicating with each other. Specifically, the heater 58 described above is built in the barrel 50. The screw 41 according to the present embodiment is a so-called flat screw, and may be referred to as "scroll".

The screw 41 has a substantially cylindrical shape in which a height in a direction along a central axis RX is smaller than a diameter. The screw 41 has a groove forming surface 42 in which a screw groove 45 is formed in a surface facing the barrel 50. Specifically, the groove forming surface 42 faces a screw facing surface 52 of the barrel 50 to be described later. The central axis RX according to the present embodiment coincides with the rotation axis of the screw 41. The configuration of the screw 41 on the groove forming surface 42 side will be described in detail later.

The drive motor 32 is coupled to a surface of the screw 41 opposite to the groove forming surface 42. The drive motor 32 is driven under the control of the control unit 300. The screw 41 is rotated about the central axis RX by the torque generated by the rotation of the drive motor 32. The drive motor 32 may not be directly coupled to the screw 41, and may be coupled via, for example, a speed reducer.

The barrel 50 has the screw facing surface 52 facing the groove forming surface 42 of the screw 41. The case portion 91 is disposed so as to cover a surface of the barrel 50 opposite to the screw facing surface 52, that is, a lower surface of the barrel 50. The communication hole and the opening 94 described above are provided at positions overlapping the central axis RX of the screw 41. That is, the through hole 80 is located at a position overlapping the central axis RX.

As described above, the nozzle tip 60 is detachably attached to the through hole 80 of the heating block 90. The nozzle tip 60 is provided with the nozzle flow path 61 described above. The nozzle flow path 61 has a nozzle opening 63 at a tip end of the nozzle tip 60, and has an inflow port 65 at a rear end of the nozzle tip 60. In the present embodiment, the nozzle opening 63 is located at a position in a −Z direction of the inflow port 65. The nozzle tip 60 according to the present embodiment discharges the material, which has flowed into the nozzle flow path 61 through the through hole 80 and the inflow port 65, from the nozzle opening 63 toward the stage 220.

Figure 3:
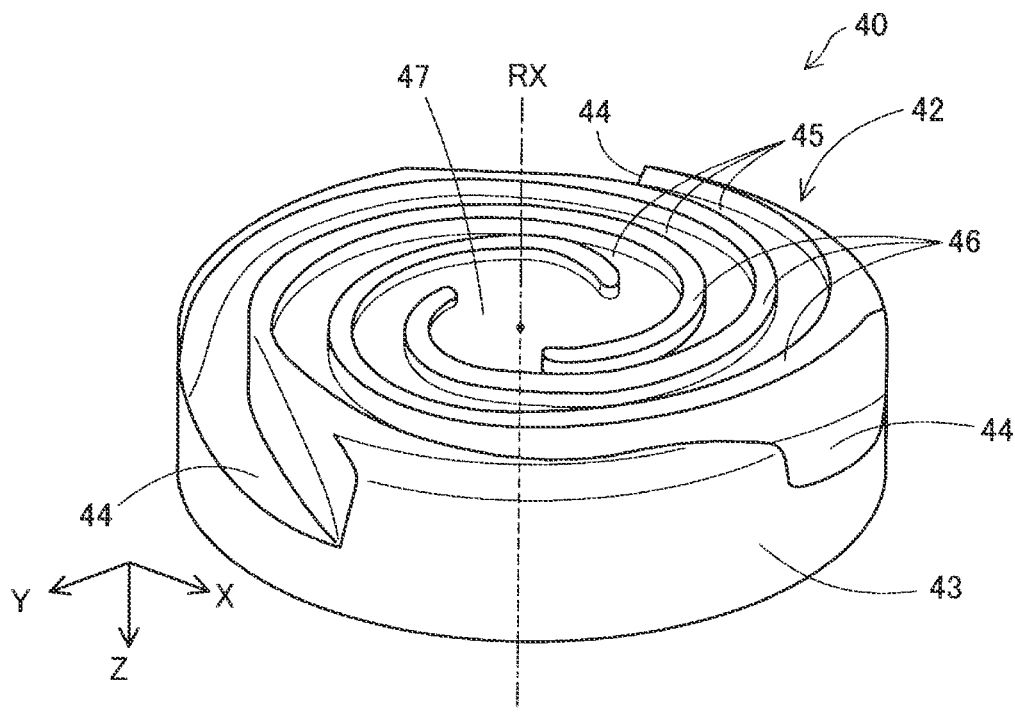
FIG. 3 is a schematic perspective view showing a configuration of a screw.

FIG. 3 is a schematic perspective view showing a configuration of the screw 41 on the groove forming surface 42 side. In FIG. 3, the position of the central axis RX of the screw 41 is indicated by a one-dot chain line. As described above, the screw groove 45 is provided in the groove forming surface 42. A screw central portion 47, which is a central portion of the groove forming surface 42 of the screw 41, is implemented as a recess to which one end of the screw groove 45 is coupled. The screw central portion 47 faces the communication hole 56 of the barrel 50 shown in FIG. 1. The screw central portion 47 intersects the central axis RX.

The screw groove 45 of the screw 41 constitutes a so-called scroll groove. The screw groove 45 extends in a spiral shape from the screw central portion 47 toward an outer periphery of the screw 41 so as to draw an arc. The screw groove 45 may be implemented to extend in an involute curve shape or a spiral shape. The groove forming surface 42 is provided with a ridge portion 46 that constitutes a side wall portion of the screw groove 45 and extends along each screw groove 45. The screw groove 45 is continuous to a material introduction port 44 formed in a side surface 43 of the screw 41. The material introduction port 44 is a portion that receives the material supplied through the supply path 22 of the material accommodation unit 20.

FIG. 3 shows an example of the screw 41 having three screw grooves 45 and three ridge portions 46. The number of the screw grooves 45 and the ridge portions 46 provided in the screw 41 is not limited to three, and only one screw groove 45 may be provided, or two or more screw grooves 45 may be provided. FIG. 3 shows an example of the screw 41 in which the material introduction ports 44 are formed at three positions. The number of the material introduction ports 44 provided in the screw 41 is not limited to three. The material introduction ports 44 may be provided only at one position or may be provided at two or more positions.

Figure 4:
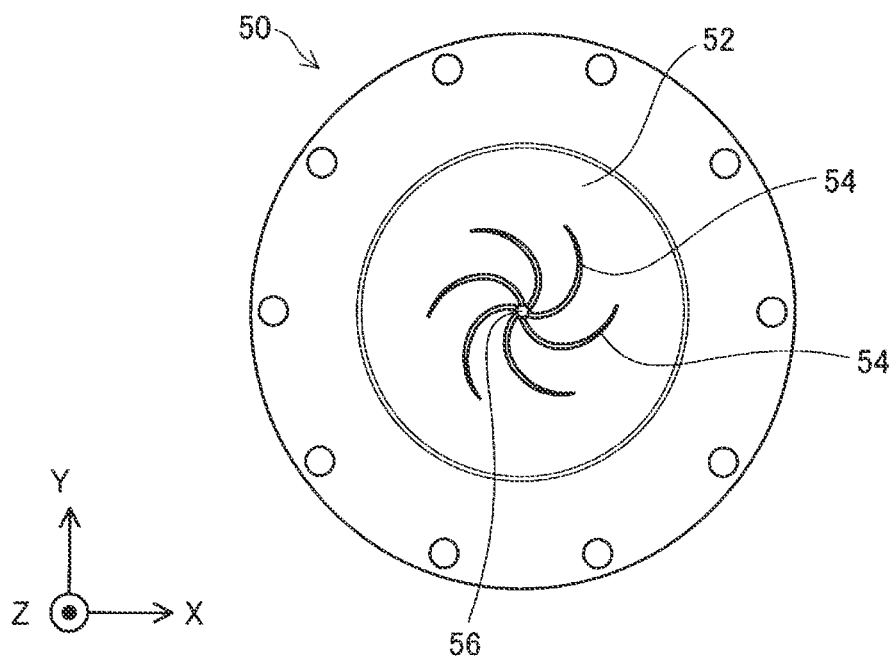
FIG. 4 is a top view showing a configuration of a barrel.

FIG. 4 is a top view showing a configuration of the barrel 50 on the screw facing surface 52 side. As described above, the communication hole 56 is formed in the center of the screw facing surface 52. A plurality of guide grooves 54 are formed around the communication hole 56 on the screw facing surface 52. One end of each guide groove 54 is coupled to the communication hole 56, and extends in a spiral shape from the communication hole 56 toward an outer periphery of the screw facing surface 52. Each of the guide grooves 54 has a function of guiding the shaping material to the communication hole 56. One end of the guide groove 54 may not be coupled to the communication hole 56. The guide groove 54 may not be formed in the barrel 50.

Figure 5:
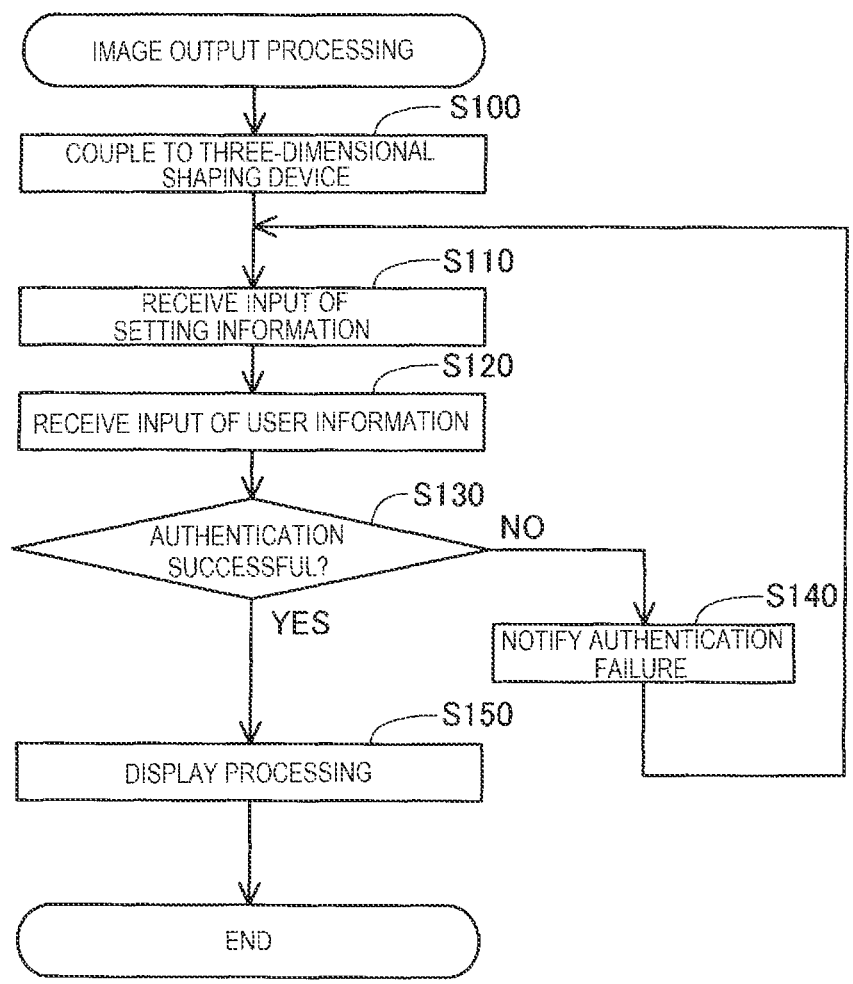
FIG. 5 is a flowchart of image output processing.

FIG. 5 is a flowchart of image output processing. The image output processing is processing for causing the display device 400 to display the image of the shaping region of the three-dimensional shaping device 5, and is processing executed when an image display program is activated in the computer 410 of the display device 400.

First, in step S100, the computer 410 establishes coupling with the three-dimensional shaping device 5.

Subsequently, in step S110, the computer 410 receives an input of setting information for displaying the image captured by the camera 8 on the display unit 420 from the user. Whether to display the image captured by the camera 8 on the display unit 420 can be set for each shaping data in the setting information. The computer 410 can acquire the setting information from the user in at least one period before starting shaping of the three-dimensional shaped object, during shaping of the three-dimensional shaped object, and after shaping of the three-dimensional shaped object. In the present embodiment, in step S120, the computer 410 further receives an input of user information from the user. The user information includes, for example, a user ID and a password.

In step S130, the computer 410 refers to a first user information database stored in a storage device provided in the computer 410, and executes authentication processing of determining whether the user ID and the password associated with the shaping data currently being used for shaping match the user ID and the password input from the user in step S120.

FIG. 6 is a diagram showing a data structure of a first user information database DB1. As shown in FIG. 6, in the user information database, user information of one or a plurality of users is recorded in association with each shaping data. The user information is registered, for example, until the user creates the shaping data using various types of software and transmits the shaping data to the three-dimensional shaping device 5. The user who creates the shaping data can also register the user information of another user with respect to the shaping data.

When the authentication fails as a result of the authentication processing in step S130, the computer 410 displays an authentication failure notification indicating that the authentication fails on the display unit 420 in step S140, returns the processing to step S110, and receives the input of the setting information again. The computer 410 may end the image output processing after displaying the authentication failure notification on the display unit 420.

When the authentication is successful as a result of the authentication processing in step S130, the computer 410 executes display processing of displaying the image captured by the camera 8 on the display unit 420 in step S150. The display processing in the first embodiment is referred to as "first processing". In the first processing, the computer 410 transmits the setting information input in step S110 to the control unit 300 of the three-dimensional shaping device 5. When the setting information is acquired, the control unit 300 of the three-dimensional shaping device 5 performs, based on the setting information, processing of transmitting the image to the display device 400 or processing of not transmitting the image to the display device 400. That is, when an instruction to display the image is given in the setting information, the control unit 300 transmits the image captured by the camera 8 to the computer 410 in the first processing. In this way, the computer 410 can cause the display unit 420 to display the image captured by the camera 8 received from the three-dimensional shaping device 5. In the present embodiment, in the first processing, the control unit 300 transmits the image to the display device 400 at a predetermined interval. The predetermined interval is, for example, 5 seconds to 60 seconds. The image is an image immediately captured, that is, in real time. The "immediate" may include a time required for image processing and a delay of communication. Therefore, a delay of about several seconds may occur from the capturing of the image by the camera 8 to the display on the display device 400.

According to the three-dimensional shaping device 5 in the first embodiment described above, it is possible to designate, based on the setting information for each shaping data, whether to display the image or the moving image of the shaping region captured by the camera 8 on the external display device 400. Therefore, it is possible to reduce the possibility that the shaped object of the current user is viewed by another user. As a result, when a plurality of persons share the three-dimensional shaping device, it is easy to shape a confidential component.

In the present embodiment, the user information including the user ID and the password is input together with the setting information from the user, and a correspondence between the shaping data and the user is authenticated based on the user information. Therefore, it is possible to more effectively reduce the possibility that the shaped object is viewed by another user. In another embodiment, such authentication processing may be omitted.

In the present embodiment, the control unit 300 of the three-dimensional shaping device 5 can acquire, from the computer 410, the setting information input by the user of the computer 410 that outputs the shaping data to the three-dimensional shaping device 5. Therefore, the user who outputs the shaping data to the three-dimensional shaping device 5 can set whether to display the image or the moving image captured by the camera. Furthermore, in the present embodiment, one or more users are associated with each shaping data. The control unit 300 of the three-dimensional shaping device 5 can acquire the setting information input by the user associated with the shaping data. Therefore, the control unit 300 can present an image not only to the user during shaping but also to other users having valid authority.

In the present embodiment, in the first processing, the image is transmitted to the display device 400 at the predetermined interval. Therefore, a communication amount between the three-dimensional shaping device 5 and the display device 400 can be reduced. In another embodiment, the image may be continuously transmitted to the display device 400 instead of at the predetermined interval.

In the present embodiment, since the display device 400 is caused to display an immediate image, the user can view the state of the three-dimensional shaped object being shaped in real time. Therefore, when a shaping failure or the like occurs, the three-dimensional shaping device 5 can be quickly stopped. In another embodiment, instead of the immediate image, an image before the current time by a predetermined period may be stored, and the images may be sequentially transmitted to the display device 400 to be displayed.

In the present embodiment, in the first processing described above, the control unit 300 switches the display of the image on the display device 400 by switching between transmission and non-transmission of the image captured by the camera 8, which is always activated, to the display device 400. On the other hand, instead of always activating the camera 8, the control unit 300 may execute, based on the setting information, second processing of activating or stopping the camera 8 instead of the first processing. That is, when an instruction to display an image is given in the setting information, in the second processing, the control unit 300 activates the camera 8 in a stopped state to transmit the image captured by the camera 8 to the display device 400. Such second processing can also switch the display of the image captured by the camera 8 with respect to the display device 400.

Instead of the first processing or the second processing, for example, the control unit 300 may always transmit to the display device 400 the image captured by the camera 8 in an always activated state, and the control unit 300 may execute, based on the setting information, third processing of transmitting output instruction information instructing whether to display the image to the display device 400. According to the third processing, the display device 400 can switch whether to display the image captured by the camera 8 that is always received, based on the output instruction information.

B. Second Embodiment

Figure 7:
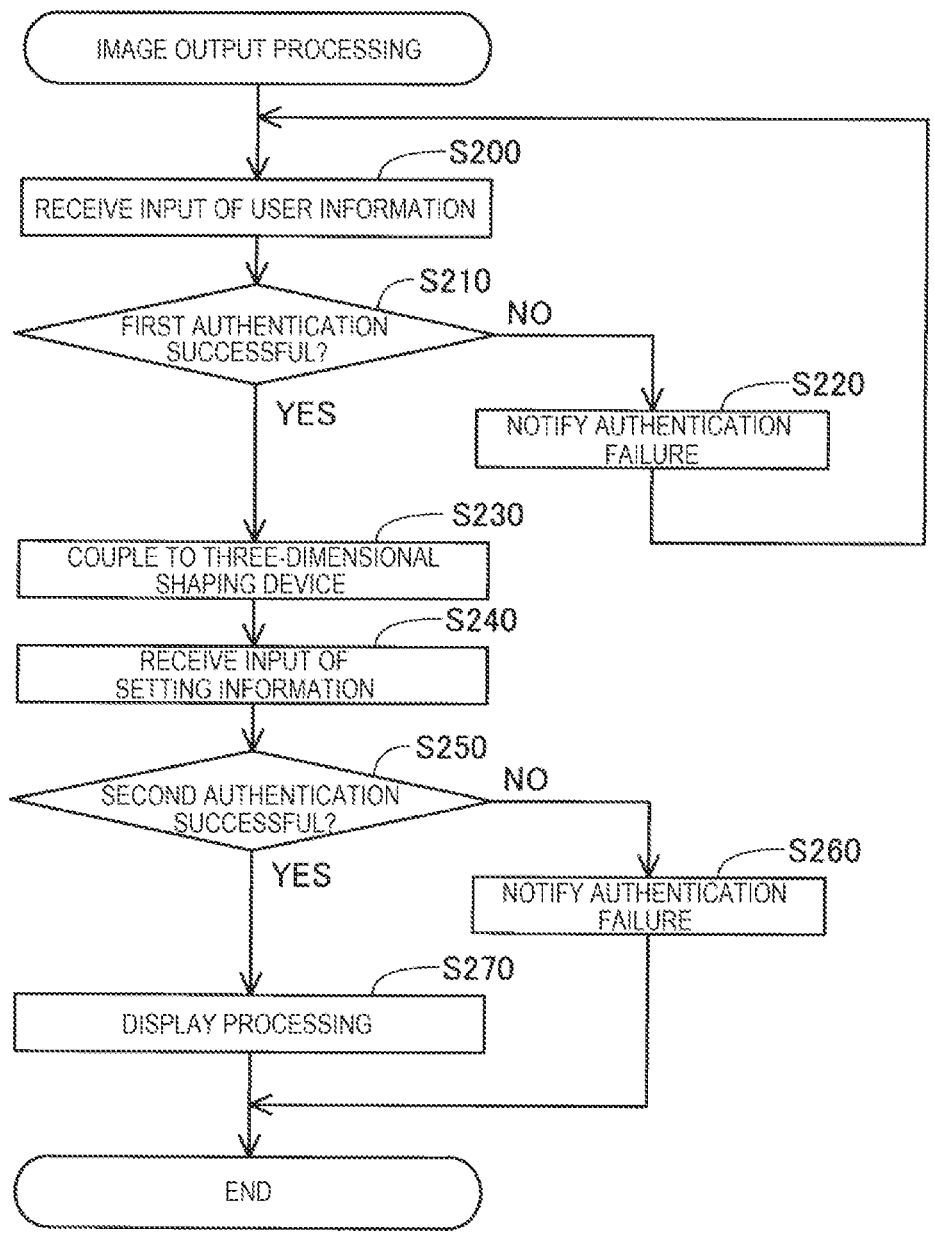
FIG. 7 is a flowchart of image output processing executed in a second embodiment.

FIG. 7 is a flowchart of image output processing executed in a second embodiment. In the first embodiment described above, the establishment of the coupling between the display device 400 and the three-dimensional shaping device 5 is not particularly limited, whereas in the second embodiment, as described below, the coupling between the display device 400 and the three-dimensional shaping device 5 is established after user authentication is performed. Since the configuration of the three-dimensional shaping device 5 is the same as that of the first embodiment, the description thereof will be omitted.

First, in step S200, the computer 410 receives an input of user information from the user. The user information includes, for example, a user ID and a password.

In step S210, the computer 410 refers to a second user information database stored in the storage device provided in the computer 410, and executes first authentication processing of determining whether the user ID and the password associated with the three-dimensional shaping device 5 match the user ID and the password input from the user in step S200.

FIG. 8 is a diagram showing a data structure of a second user information database DB2 stored in the storage device provided in the computer 410. As shown in FIG. 8, unlike the first user information database DB1, user information of one or a plurality of users is recorded in the second user information database DB2 in association with the three-dimensional shaping device 5 instead of the shaping data. The user information can be registered in the second user information database DB2 at any timing.

When the authentication fails as a result of the first authentication processing in step S210, the computer 410 causes the display unit 420 to display an authentication failure notification indicating that the authentication fails in step S220, returns the processing to step S200, and receives the input of the user information again. The computer 410 may end the image output processing after displaying the authentication failure notification on the display unit 420.

When the authentication is successful as a result of the first authentication processing in step S210, the computer 410 establishes a coupling with the three-dimensional shaping device 5 in step S230.

Subsequently, in step S240, the computer 410 receives an input of setting information for displaying the image captured by the camera 8 on the display unit 420 from the user. Whether to display the image captured by the camera 8 on the display unit 420 can be set for each shaping data in the setting information. The computer 410 can acquire the setting information from the user in at least one period before starting shaping of the three-dimensional shaped object, during shaping of the three-dimensional shaped object, and after shaping of the three-dimensional shaped object.

When the reception of the input of the setting information is completed, in step S250, the computer 410 refers to the second user information database DB2 shown in FIG. 8, and executes second authentication processing of determining whether the user ID and the password associated with the shaping data currently used for shaping match the user ID and the password input from the user in step S200. In the second authentication processing, the user information used in the first authentication processing is used as it is. This is because the same user information may be associated with the three-dimensional shaping device 5 and the shaping data.

When the authentication fails as a result of the second authentication processing in step S250, in step S260, the computer 410 causes the display unit 420 to display an authentication failure notification indicating that the authentication fails, and ends the image output processing without causing the display device 400 to display the image captured by the camera 8. As in the image output processing according to the first embodiment shown in FIG. 5, the computer 410 may receive an input of the user information corresponding to the shaping data from the user and execute the second authentication processing again.

When the authentication is successful as a result of the second authentication processing in step S250, the computer 410 executes the display processing of displaying the image captured by the camera 8 on the display unit 420 in step S250. The display processing may be any of the first processing, the second processing, and the third processing described in the first embodiment.

According to the second embodiment described above, the authentication processing using the user information is performed when the coupling from the display device 400 to the three-dimensional shaping device 5 is established. Therefore, it is possible to further reduce the possibility that the shaped object of the current user is viewed by another user who is not the current user.

C. Third Embodiment

In the first embodiment and the second embodiment, the authentication processing can be executed by registering the user information in the three-dimensional shaping device 5 in advance. On the other hand, in a third embodiment, the image captured by the camera 8 can be displayed on the external display device 400 without registering the user information. Since the configurations of the three-dimensional shaping device 5 and the display device 400 are the same as those of the first embodiment, the description thereof will be omitted.

FIG. 9 is a flowchart of image output processing according to the third embodiment. Processing contents of the three-dimensional shaping device 5 are shown on a left side of FIG. 9, and processing contents of the display device 400 are shown on a right side of FIG. 9. The number of the display devices 400 may be two or more, and the processing shown on the right side of FIG. 9 can be executed in each of the display devices 400.

In step S300, the control unit 300 of the three-dimensional shaping device 5 receives from the user designation of image output using a shared address. The designation of the image output using the shared address may be received from an operation unit provided in the three-dimensional shaping device 5, or may be received from the display device 400 in which the authentication processing corresponding to the first authentication processing or the second authentication processing in the second embodiment is successful.

In step S310, the control unit 300 notifies the display device 400, which requests sharing of the image, of an address of a storage location of the image as the shared address. The storage location of the image may be a storage device provided in the three-dimensional shaping device 5 or may be a storage device coupled to the three-dimensional shaping device 5 via a network. The control unit 300 notifies the user, who requests the sharing of the image, of the address of the storage device as the shared address, for example, by e-mail or short message service (SMS).

In step S400, the display device 400 receives the notification of the shared address from the three-dimensional shaping device 5. In step S410, the display device 400 accesses the received shared address to display the image captured by the camera 8 in step S420.

According to the third embodiment described above, since it is not necessary to register user information in advance, it is possible to present an image only to a user who is allowed to view an image in a small number of procedures. It is preferable that the shared address is a one-time uniform resource locator (URL) that accepts access only for a limited time or a limited number of times.

D: Fourth Embodiment

Figure 10:
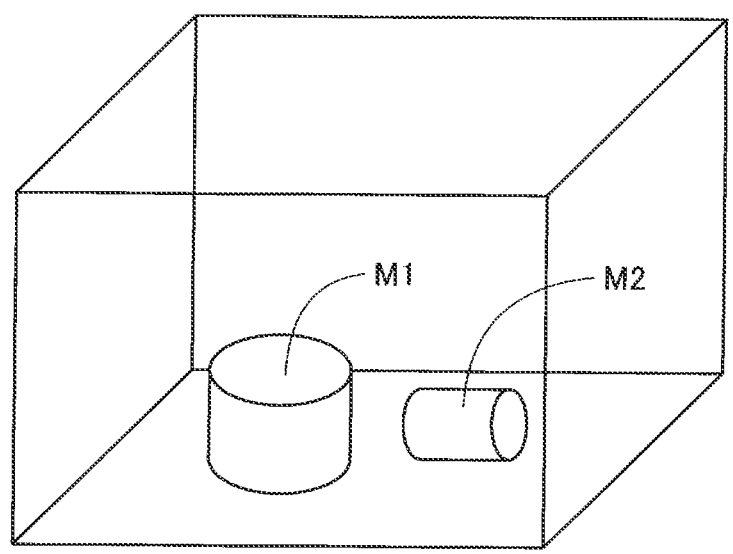
FIG. 10 is a diagram showing an example in which a plurality of three-dimensional shaped objects are disposed.

FIG. 10 is a diagram showing an example in which a plurality of three-dimensional shaped objects are disposed in one shaping region. As shown in FIG. 10, the three-dimensional shaping device 5 according to the above embodiment can simultaneously shape the plurality of three-dimensional shaped objects in parallel in one print job if shaping positions of the three-dimensional shaped objects in a plane direction are different. FIG. 10 shows a first shaped object M1 shaped by a first user and a second shaped object M2 shaped by a second user.

In the present embodiment, in a case where a plurality of pieces of shaping data are received from a plurality of users, when the plurality of shaped objects represented by the plurality of pieces of shaping data have a size that falls within one shaping region, the control unit 300 synthesizes the plurality of pieces of shaping data to generate one piece of shaping data. Then, the control unit 300 simultaneously shapes the three-dimensional shaped objects of a plurality of users in one print job by shaping the three-dimensional shaped objects based on the synthesized shaping data. When the shaping data is being synthesized, the control unit 300 stores the shaping position of each three-dimensional shaped object and the user information in an internal memory in association with each other. The configuration of the three-dimensional shaping device 5 according to the fourth embodiment is the same as that of the first embodiment, and thus the description thereof will be omitted.

Figure 11:
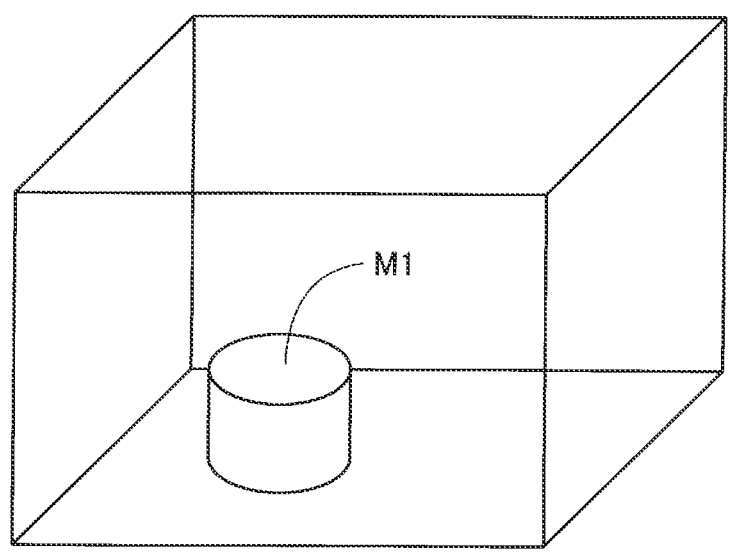
FIG. 11 is a diagram showing a first display example of an image according to a fourth embodiment.
Figure 12:
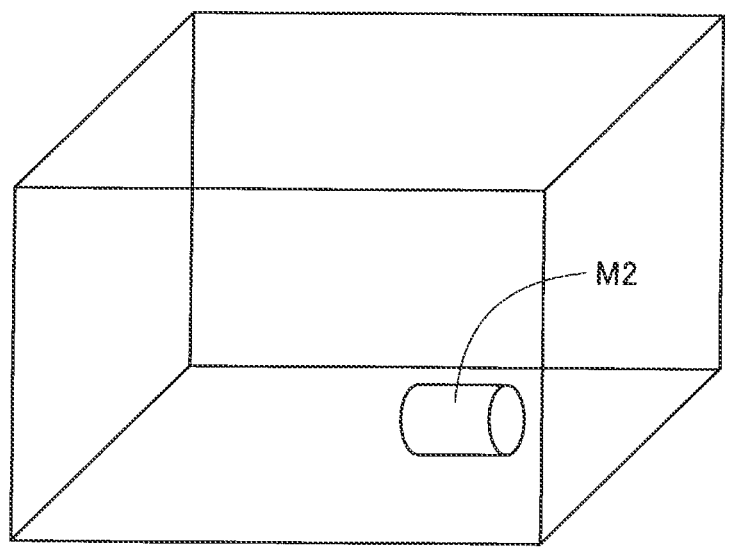
FIG. 12 is a diagram showing the first display example of the image according to the fourth embodiment.

FIGS. 11 and 12 are diagrams showing a first display example of an image according to the fourth embodiment. The control unit 300 according to the present embodiment has a function of executing obfuscation processing of obfuscating a region of the image captured by the camera 8 in which at least one three-dimensional shaped object among the plurality of three-dimensional shaped objects is captured when simultaneously shaping the plurality of three-dimensional shaped objects based on the plurality of shaping data as described above. FIG. 11 shows, as an example of the obfuscation processing, an example in which image processing is performed in which three-dimensional shaped objects on the shaping region corresponding to users other than a first user who issues an image output request are erased and only the first shaped object M1 of the first user is displayed. Such image processing is referred to as non-display processing. FIG. 12 shows an example in which the non-display processing of erasing three-dimensional shaped objects on the shaping region corresponding to users other than a second user who issues an image output request, and displaying only the second shaped object M2 of the second user is performed. The control unit 300 calculates a region in the image to be obfuscated based on the user information, the position of the three-dimensional shaped object corresponding to the user information, and a capturing direction of the camera.

Figure 13:
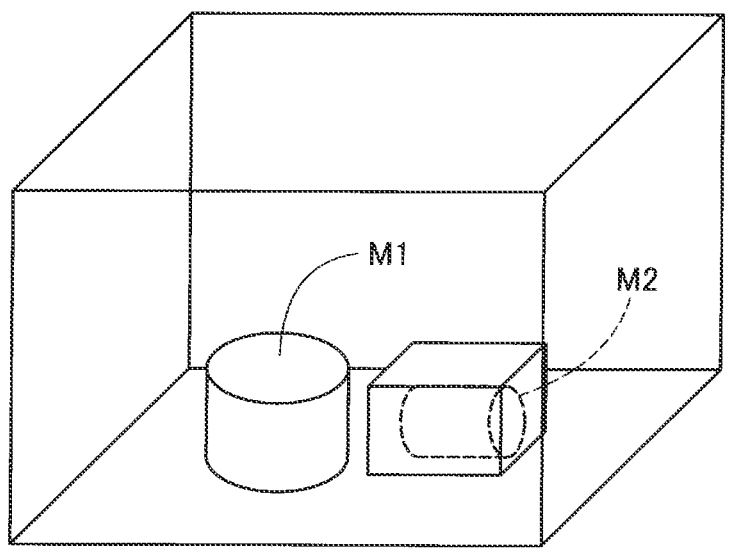
FIG. 13 is a diagram showing a second display example of the image according to the fourth embodiment.

FIG. 13 is a diagram showing a second display example of the image according to the fourth embodiment. FIG. 13 shows, as an example of the obfuscation processing, an example in which conversion processing of converting an image of a three-dimensional shaped object on a shaping region corresponding to a user other than the first user who issues the image output request into an image irrelevant to the shaped object is performed. FIG. 13 shows an example in which the cylindrical second shaped object M2 before obfuscation is indicated by a broken line, and the shape of the second shaped object M2 is converted into a rectangular parallelepiped shape by the obfuscation.

Figure 14:
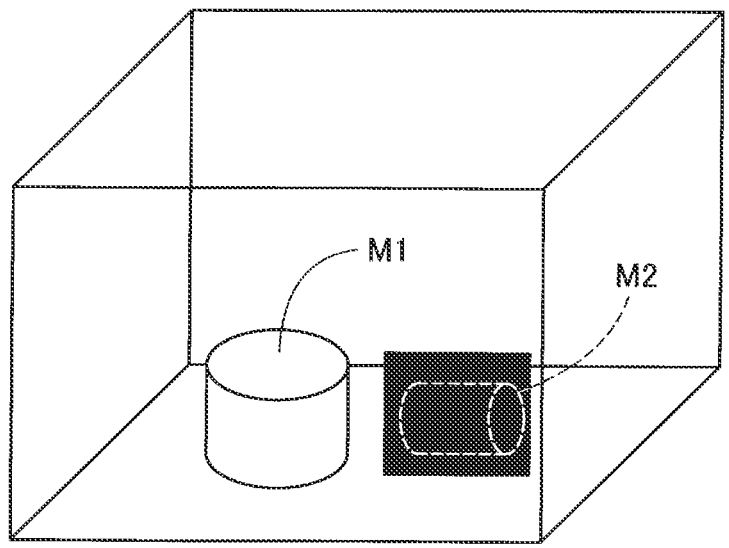
FIG. 14 is a diagram showing a third display example of the image according to the fourth embodiment.

FIG. 14 is a diagram showing a third display example of the image according to the fourth embodiment. FIG. 14 shows, as an example of the obfuscation processing, an example in which image processing of filling, with a single color, a three-dimensional shaped object on a shaping region corresponding to a user other than the first user who issues an image output request is performed. Although FIG. 14 shows an example in which the shaped object is filled with a single color, the shaped object may be filled with gradation or may be subjected to mosaic processing.

According to the fourth embodiment described above, when the three-dimensional shaped objects of the plurality of users are simultaneously shaped, images of three-dimensional shaped objects of other users can be obfuscated. Therefore, it is possible to prevent another user from viewing the three-dimensional shaped object. Therefore, even when the three-dimensional shaped objects of a plurality of users are simultaneously shaped, it is easy to shape a confidential component.

In the fourth embodiment, the control unit 300 of the three-dimensional shaping device 5 executes the obfuscation processing. In contrast, the obfuscation processing may be executed in the display device 400. In this case, the control unit 300 transmits the image captured by the camera 8 to the display device 400 as it is, and transmits, to the display device 400, an instruction to perform the obfuscation processing on at least one three-dimensional shaped object among the plurality of three-dimensional shaped objects, more specifically, a region in which a three-dimensional shaped object of a user other than the user who is currently using the display device 400 is captured. Thus, when the obfuscation processing is performed on the display device 400, it is not necessary to perform the obfuscation processing for each user in the three-dimensional shaping device 5. Therefore, it is possible to reduce a processing load of the three-dimensional shaping device 5.

E. Fifth Embodiment

Figure 15:
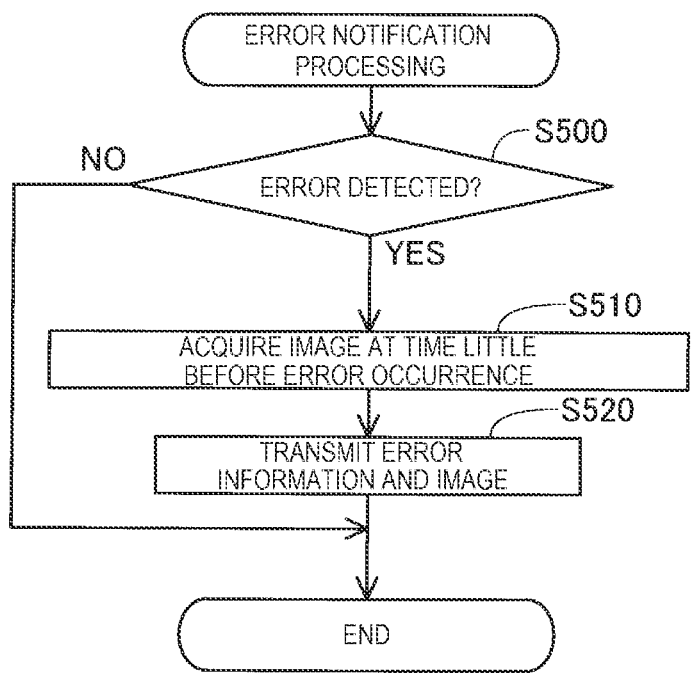
FIG. 15 is a flowchart of error notification processing according to a fifth embodiment.

FIG. 15 is a flowchart of error notification processing executed in a fifth embodiment. The error notification processing is processing repeatedly executed by the control unit 300 of the three-dimensional shaping device 5 during shaping of the three-dimensional shaped object. In the present embodiment, the control unit 300 always stores the image of the shaping region captured during shaping in the storage device provided in the three-dimensional shaping device 5 for a predetermined period, and performs processing of sequentially erasing old images. The predetermined period is, for example, 1 minute to 10 minutes. The configuration of the three-dimensional shaping device 5 according to the fifth embodiment is the same as that of the first embodiment, and thus the description thereof will be omitted.

In step S500, the control unit 300 determines whether an error is detected during shaping. Examples of the error during the shaping include a rotation failure of the drive motor 32, a heating failure of the heater 58, a material supply failure from the material accommodation unit 20, and a movement failure of the stage 220 by the movement mechanism 210.

When an error is not detected in step S500, the control unit 300 ends the error notification processing. When an error is detected in step S500, the control unit 300 acquires an image stored in the storage device in step S510. As described above, the image is an image before a predetermined period from the detection of the error.

In step S520, the control unit 300 transmits the image acquired from the storage device and error information indicating a type of the error to the display device 400. When the error information and the image are acquired from the three-dimensional shaping device 5, the display device 400 displays the error information and the image.

According to the fifth embodiment described above, since the user can confirm the image before the occurrence of the error, the user can easily confirm a cause and a situation of the occurrence of the error. In the present embodiment, the three-dimensional shaping device 5 stores the image for the predetermined period. Alternatively, the control unit 300 of the three-dimensional shaping device 5 may cause the display device 400 to store the image for the predetermined period.

F. Sixth Embodiment

Figure 16:
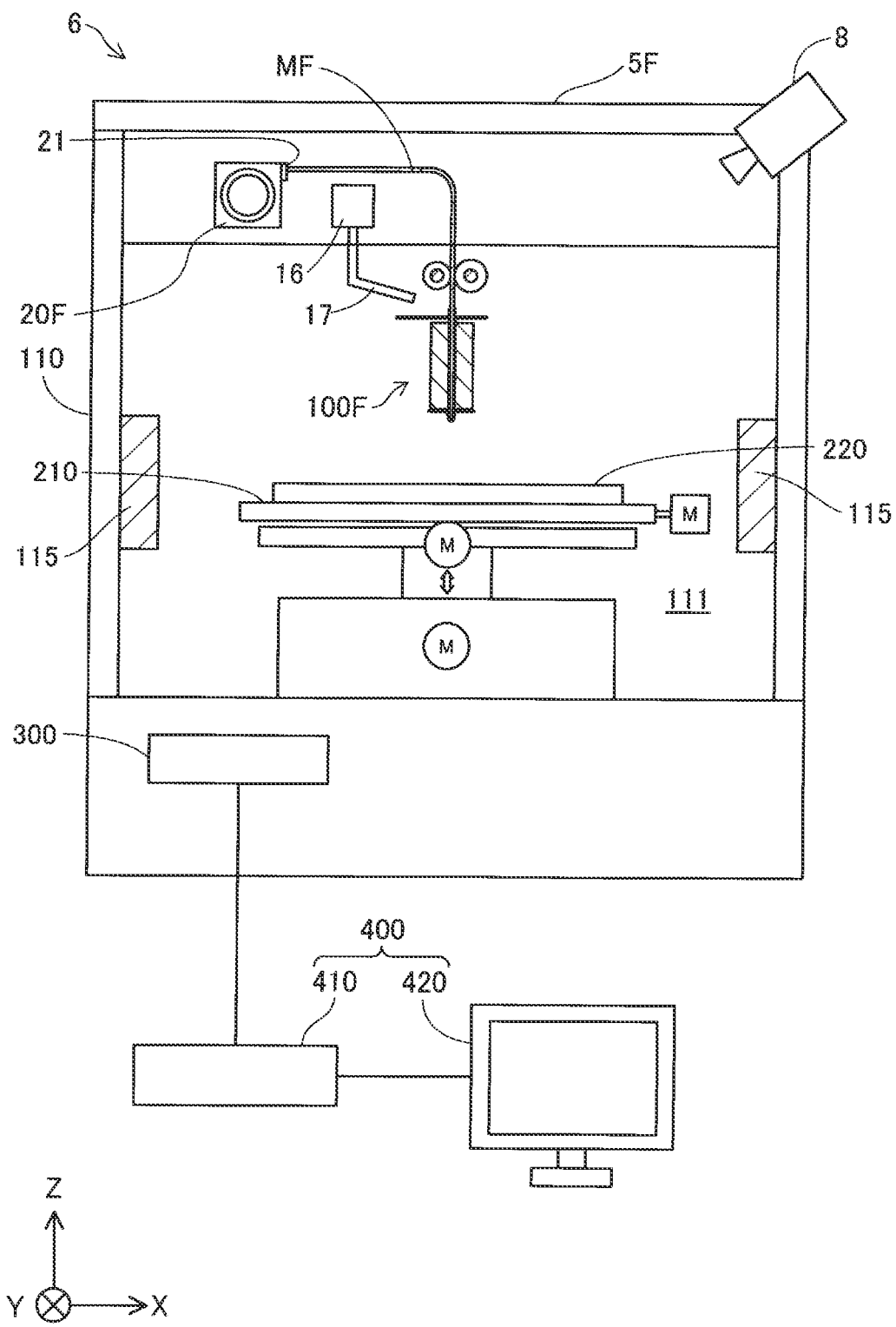
FIG. 16 is a diagram showing a schematic configuration of a three-dimensional shaping device according to a sixth embodiment.

FIG. 16 is a diagram showing a schematic configuration of a three-dimensional shaping device 5F according to a sixth embodiment. Similar to the first embodiment, the three-dimensional shaping device 5F according to the present embodiment is a three-dimensional shaping device of a material extrusion method, whereas the configuration of each unit is different from that of the first embodiment. In the configuration of the three-dimensional shaping device 5F according to the present embodiment, the description of the same configuration as that of the first embodiment will be omitted.

As in the first embodiment, the three-dimensional shaping device 5F according to the present embodiment includes a discharge unit 100F, a material accommodation unit 20F, the chamber 110, the movement mechanism 210, the stage 220, the control unit 300, and the camera 8. The three-dimensional shaping device 5F further includes a blower 16. The blower 16 is a blower that blows air toward the discharge unit 100F through a manifold 17. In the present embodiment, a portion of the manifold 17, the discharge unit 100F, the movement mechanism 210, and the stage 220 are accommodated in the shaping space 111 in the chamber 110.

The material accommodation unit 20F according to the present embodiment is implemented as a holder that accommodates a filament-shaped material MF. The material accommodation unit 20F includes an outlet 21. The material accommodation unit 20F is implemented to allow the material MF accommodated therein to be unwound to the outside of the material accommodation unit 20F via the outlet 21.

Figure 17:
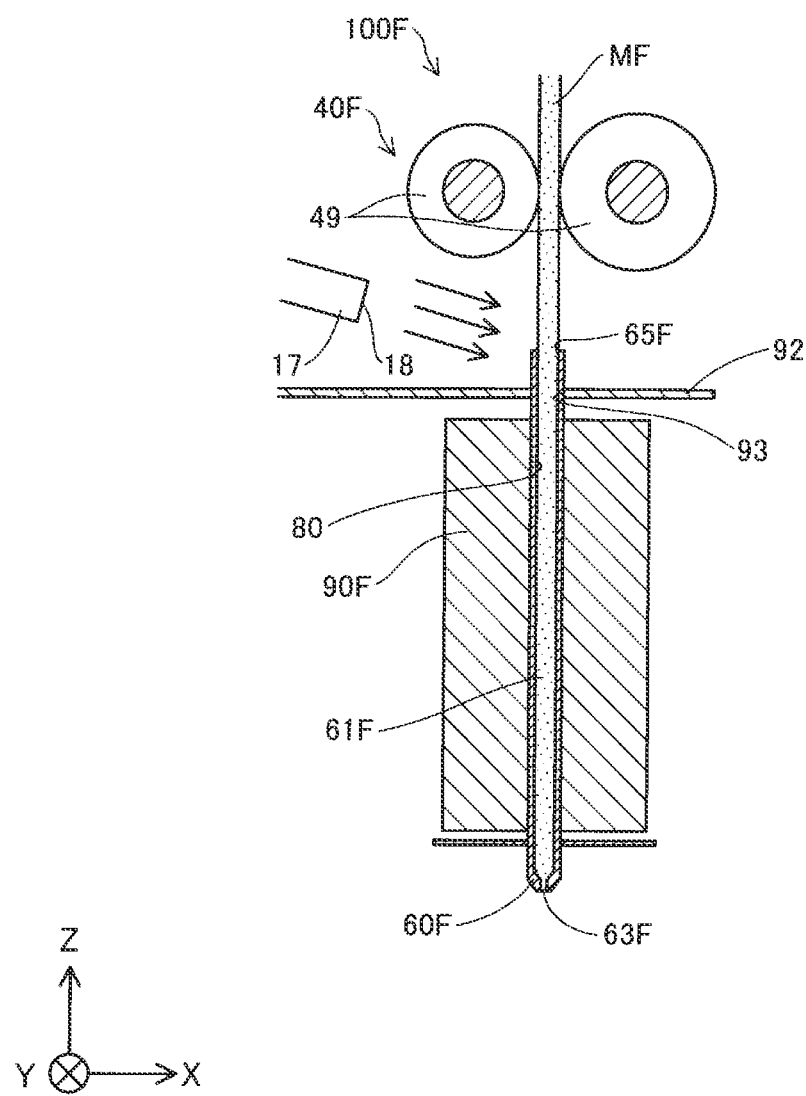
FIG. 17 is a diagram showing a schematic configuration of a discharge unit according to the sixth embodiment.

FIG. 17 is a diagram showing a schematic configuration of the discharge unit 100F according to the present embodiment. The discharge unit 100F includes a heating block 90F including a heater and provided with the through hole 80, a nozzle tip 60F detachably attached to the through hole 80, and a material conveying mechanism 40F that conveys a material toward a nozzle flow path 61F of the nozzle tip 60F attached to the heating block 90F. The discharge unit 100F further includes a heat shield 92 that is disposed between the material conveying mechanism 40F and the heating block 90F in the Z direction, and that prevents heat transfer from the heating block 90F to the material conveying mechanism 40F. Unlike the first embodiment, the material conveying mechanism 40F according to the present embodiment is implemented by two wheels 49 without the screw case 31 and the screw 41. Unlike the first embodiment, the heating block 90F does not include the barrel 50 and the case portion 91.

The nozzle tip 60F according to the present embodiment is attached to the heating block 90F by being inserted into the through hole 80 and a shield opening 93 provided in the heat shield 92 from a −Z direction. That is, in the present embodiment, a dimension of the nozzle tip 60F along the Z direction and a dimension of the nozzle flow path 61F along the Z direction are longer than a dimension of the through hole 80 along the Z direction. Therefore, in the present embodiment, an inflow port 65F provided at a rear end of the nozzle tip 60F is located in a +Z direction of the heating block 90F, more specifically, in the +Z direction of the heat shield 92.

The two wheels 49 implementing the material conveying mechanism 40F draw out the material MF in the material accommodation unit 20F to the outside, guide the material MF to between the two wheels 49 by the rotation thereof, and convey the material MF toward the nozzle flow path 61F of the nozzle tip 60F attached to the through hole of the heating block 90F. The heating block 90F plasticizes the material MF conveyed into the nozzle flow path 61F of the nozzle tip 60F by heating a heater (not shown) built in the heating block 90F.

The material MF according to the present embodiment is cooled near the inflow port 65F of the nozzle tip 60F by the air sent from the blower 16 through the manifold 17.

Accordingly, plasticization of the material MF in the vicinity of the inflow port 65F is prevented, and the material MF is efficiently conveyed into the inflow port 65F. An outlet end 18 of the manifold 17 is located in the +Z direction of the heat shield 92. Accordingly, the air sent out from the manifold 17 is easily guided to the vicinity of the inflow port 65F by the heat shield 92, and thus the material MF in the vicinity of the inflow port 65F is efficiently cooled.

The three-dimensional shaping device 5F according to the present embodiment described above can also shape a three-dimensional shaped object in the same manner as the three-dimensional shaping device 5 according to the first embodiment.

G. Reference Example

Figure 18:
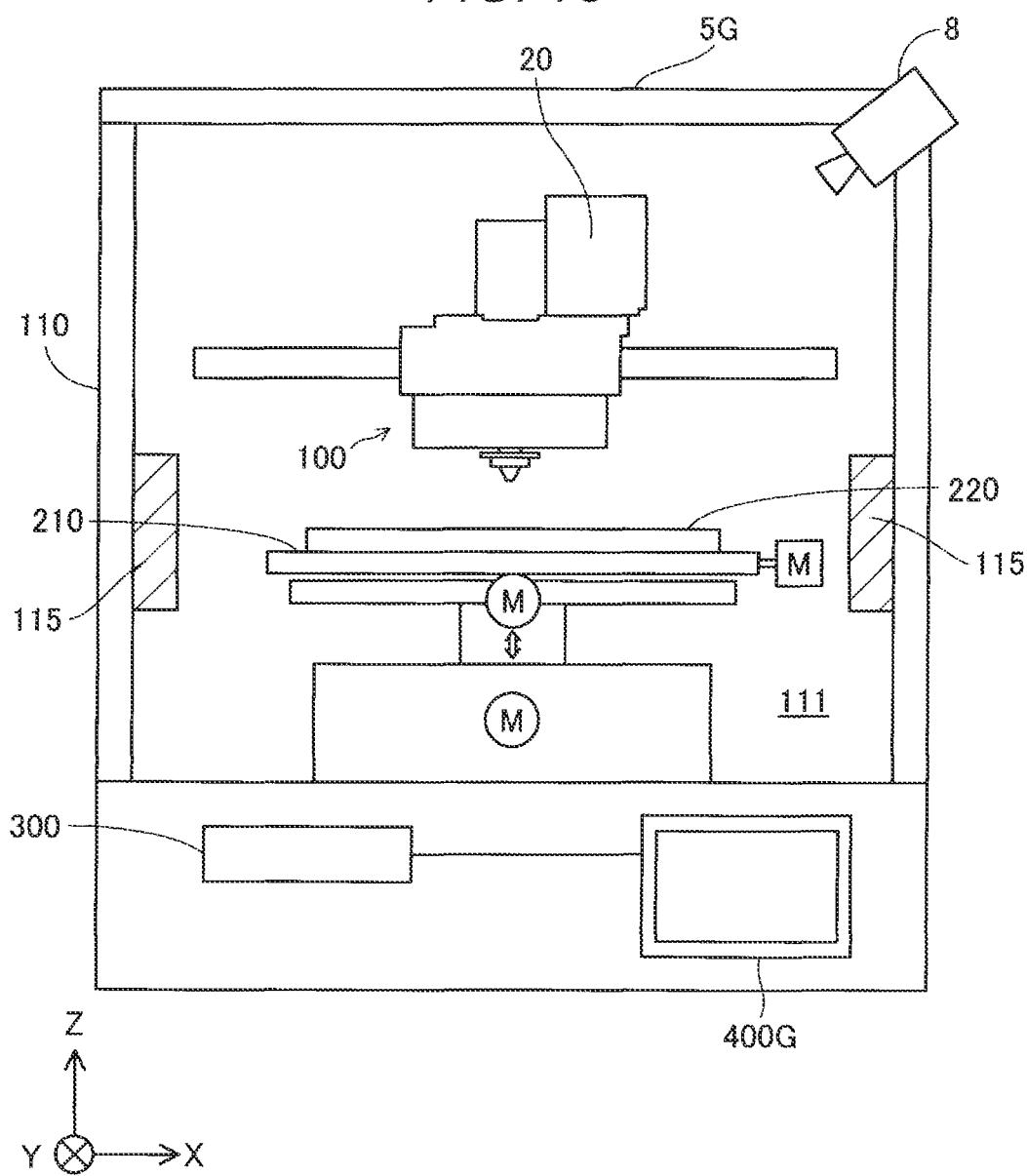
FIG. 18 is a diagram showing a schematic configuration of a three-dimensional shaping device as a reference example.

FIG. 18 is a diagram showing a schematic configuration of a three-dimensional shaping device 5G as a reference example. The three-dimensional shaping device 5G according to the reference example is different from the three-dimensional shaping device 5 according to the first embodiment in that the three-dimensional shaping device 5G includes a display device 400G. The display device 400G according to the present embodiment is implemented by a display device including a touch panel. The display device 400G is controlled by the control unit 300. The display device 400G can display the same content as the display content displayed on the display device 400 according to the first embodiment. Other configurations of the three-dimensional shaping device 5G are the same as those of the three-dimensional shaping device 5 according to the first embodiment.

Figure 19:
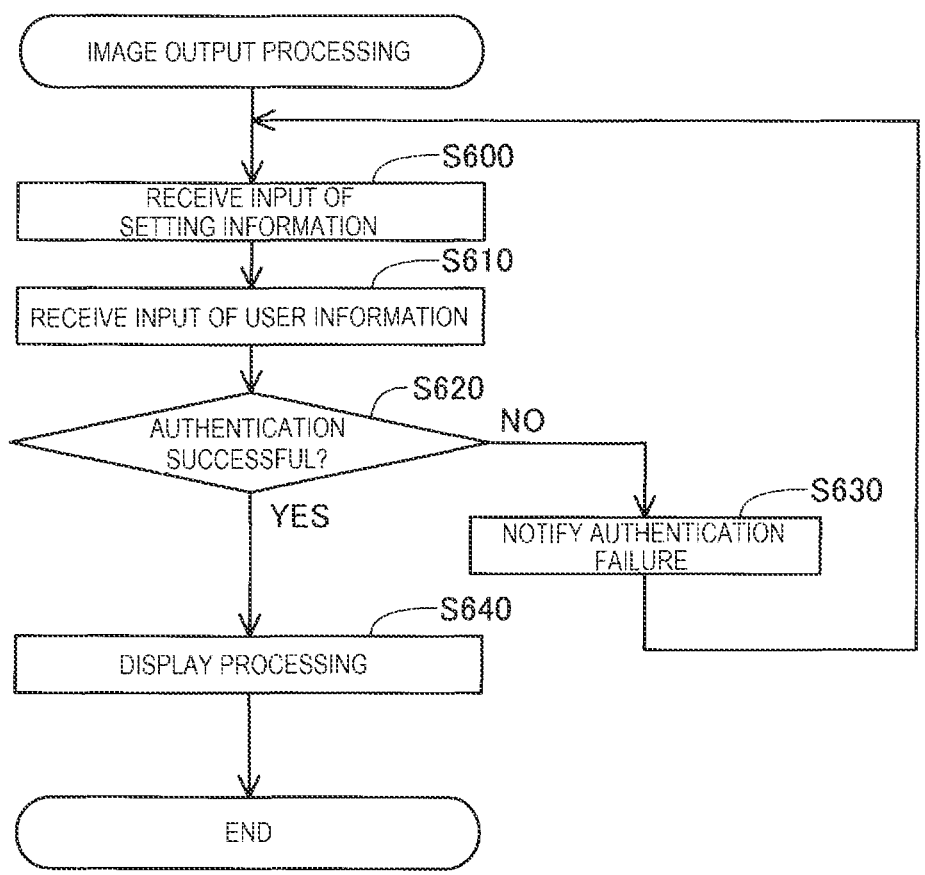
FIG. 19 is a flowchart of image output processing in the reference example.

FIG. 19 is a flowchart of image output processing executed by the three-dimensional shaping device 5G. The image output processing shown in FIG. 19 is executed by the control unit 300 of the three-dimensional shaping device 5G.

In step S600, the control unit 300 receives, from the user via the touch panel, an input of setting information for displaying an image captured the camera 8 on the display device 400G. In step S610, the control unit 300 further receives an input of user information from the user.

In step S620, the control unit 300 refers to the first user information database DB1 stored in the storage device provided in the control unit 300, and executes authentication processing of determining whether a user ID and a password associated with the shaping data currently used for shaping match the user ID and the password input from the user in step S610.

When the authentication fails as a result of the authentication processing in step S620, the control unit 300 displays an authentication failure notification indicating that the authentication fails on the display device 400G in step S630, returns the processing to step S600, and receives the input of the setting information again. The control unit 300 may end the image output processing after displaying the authentication failure notification on the display device 400G.

When the authentication is successful as a result of the authentication processing in step S620, the control unit 300 executes display processing of displaying the image captured by the camera 8 on the display device 400G in step S640.

According to the three-dimensional shaping device 5G in the reference example described above, it is possible to switch whether to display the image of the shaping region captured by the camera 8 on the display device 400G based on the setting information acquired from the user. Therefore, it is possible to reduce the possibility that the shaped object of the current user is viewed by another user who is not the current user. For example, when a three-dimensional shaping device is shared by a plurality of persons, it is easy to shape a confidential component. In particular, in the present embodiment, since the input of the user information including the user ID and the password together with the setting information is received from the user and the authentication processing is performed based on the user information, it is possible to more effectively reduce the possibility that the shaped object is viewed by another user.

H. Other Embodiments (H-1) In the above-described embodiments, the user may be able to select any one of an ON state of the camera 8, an OFF state of the camera 8, and an intermediate mode in which the progress of shaping can be confirmed but the shaped object cannot be recognized in the setting information. When the intermediate mode is selected, for example, the control unit 300 of the three-dimensional shaping device 5 performs blurring processing on the image of the shaped object being shaped or converts the image into an image of an object unrelated to the shaped object being shaped, and displays the image on the display device 400, thereby making it possible to confirm the progress of shaping. The image of the object unrelated to the shaped object being shaped is, for example, an image of a progress bar, or an hourglass. The image in the intermediate mode may be displayed on the display device 400 of a user other than the user associated with the shaping data.

(H-2) In the embodiments described above, the three-dimensional shaping device 5 may be surrounded by an opaque wall such that an appearance during shaping cannot be visually recognized from the outside. In this way, it is possible to more reliably prevent the shaped object being currently shaped from being viewed by another user.

(H-3) In the embodiments described above, the three-dimensional shaping device 5 may include a plurality of cameras 8 capable of capturing the shaping region on the stage 220. In this case, a configuration may be adopted in which the cameras 8 are disposed so as to be able to capture images of different shaping regions on the stage 220, and whether to display the images captured by the cameras 8 on the display device 400 can be set by a user having authority for each image. In this way, when three-dimensional shaped objects of a plurality of users are simultaneously shaped, each user can set whether to display the image captured by the camera 8 that captures the three-dimensional shaped object of the user on the display unit 400, and can prevent the image from being viewed by other users. Furthermore, as in the above-described embodiments, it is possible to omit complicated processing of obfuscating a region in which one three-dimensional shaped object is captured.

I. Other Aspects:

The present disclosure is not limited to the embodiments described above, and can be implemented in various forms without departing from the scope of the present disclosure. For example, the present disclosure can be implemented in the following aspects. In order to solve a part of or all of problems of the present disclosure, or to achieve a part of or all of effects of the present disclosure, technical features in the above-described embodiments corresponding to technical features in the following aspects can be replaced or combined as appropriate. Technical features can be deleted as appropriate unless the technique features are described as essential in the present specification.

(1) According to a first aspect of the present disclosure, a three-dimensional shaping device is provided. The three-dimensional shaping device includes: a discharge unit including a plasticizing mechanism which plasticizes at least a part of a material and configured to discharge the plasticized material toward a shaping region of a stage; a camera configured to capture an image of the shaping region; and a control unit configured to control the discharge unit based on shaping data for shaping a three-dimensional shaped object. When the control unit acquires setting information for setting whether to display an image or a moving image captured by the camera on an external display unit in at least one of a period before starting shaping of the three-dimensional shaped object, a period during shaping of the three-dimensional shaped object, and a period after shaping of the three-dimensional shaped object, the control unit executes, based on the setting information, for each of the shaping data, first processing of transmitting or not transmitting the image or the moving image to the display unit, second processing of activating or stopping the camera, and third processing of transmitting, to the display unit, output instruction information instructing whether to display the image or the moving image on the display unit.

According to such an aspect, it is possible to designate whether to display, based on the setting information for each shaping data, the image or the moving image of the shaping region captured by the camera on the external display unit. Therefore, it is possible to reduce the possibility that the shaped object of the current user is recognized by another user. As a result, when a plurality of persons share the three-dimensional shaping device, it is easy to shape a confidential component.

(2) In the three-dimensional shaping device according to the above aspect, the control unit may acquire the setting information input by a user who outputs the shaping data to the three-dimensional shaping device. According to such an aspect, the user who outputs the shaping data to the three-dimensional shaping device can set whether to display the image or the moving image captured by the camera.

(3) In the three-dimensional shaping device according to the above aspect, one or a plurality of users may be associated with each of the shaping data, and the control unit may acquire the setting information input by the user associated with the shaping data. According to such an aspect, it is possible to present the image or the moving image not only to a user during shaping but also to a user who has a valid authority associated with the shaping data.

(4) In the three-dimensional shaping device according to the above aspect, the control unit may transmit the image to the display unit at a predetermined interval in the first processing. According to such as aspect, it is possible to reduce a communication amount involved in image transmission from the three-dimensional shaping device to the display unit.

(5) In the three-dimensional shaping device according to the above aspect, the control unit may cause the display unit to immediately display the image or the moving image. According to such as aspect, the user can view a state of the three-dimensional shaped object being shaped in real time. Therefore, when a shaping failure or the like occurs, the three-dimensional shaping device can be quickly stopped.

(6) In the three-dimensional shaping device according to the above aspect, the control unit may transmit information including an address indicating a storage location of the image or the moving image to the display unit. According to such as aspect, it is possible to present an image to a user who is allowed to view the image or the moving image in a small number of procedures without registering user information in the three-dimensional shaping device in advance.

(7) In the three-dimensional shaping device according to the above aspect, when a plurality of three-dimensional shaped objects are simultaneously shaped based on a plurality of shaping data, the control unit may execute obfuscation processing of obfuscating a region of the image or the moving image captured by the camera in which at least one three-dimensional shaped object among the plurality of three-dimensional shaped objects is captured, or transmit an instruction of executing the obfuscation processing on the region to the display unit. According to such as aspect, when the three-dimensional shaped objects of the plurality of users are simultaneously shaped, it is possible to prevent the three-dimensional shaped object of the user from being visually recognized by another user.

(8) In the three-dimensional shaping device according to the above aspect, the obfuscation processing may include at least one of non-display processing, conversion processing to an image unrelated to the three-dimensional shaped object, filling processing, and mosaic processing.

(9) In the three-dimensional shaping device according to the above aspect, when an error occurs during the shaping of the three-dimensional shaped object, the control unit may transmit error information to the display unit, and may cause the display unit to display or store the image or the moving image captured before the occurrence of the error for a predetermined period of time. According to such as aspect, since the user can confirm the image or the moving image before occurrence of the error, the user can easily confirm a cause and a situation of the occurrence of the error.

(10) According to a second aspect of the present disclosure, a three-dimensional shaping system including a three-dimensional shaping device and a display device is provided. In the three-dimensional shaping system, the three-dimensional shaping device includes a discharge unit including a plasticizing mechanism which plasticizes at least a part of a material and configured to discharge the plasticized material toward a shaping region of a stage, a camera configured to capture an image of the shaping region, and a control unit configured to control the discharge unit based on shaping data for shaping a three-dimensional shaped object. When the control unit acquires setting information for setting whether to display an image or a moving image captured by the camera on the display device in at least one of a period before starting shaping of the three-dimensional shaped object, a period during shaping of the three-dimensional shaped object, and a period after shaping of the three-dimensional shaped object, the control unit executes, based on the setting information, for each of the shaping data, first processing of transmitting or not transmitting the image or the moving image to the display device, second processing of activating or stopping the camera, and third processing of transmitting, to the display device, output instruction information instructing whether to display the image or the moving image on the display device.

What is claimed is:
1. A three-dimensional shaping device comprising:
   a discharge unit including a plasticizing mechanism which plasticizes at least a part of a material and configured to discharge the plasticized material toward a shaping region of a stage;
   a camera configured to capture an image of the shaping region; and
   a control unit configured to control the discharge unit based on shaping data for shaping a three-dimensional shaped object, wherein when the control unit acquires setting information for setting whether to display an image or a moving image captured by the camera on an external display unit in at least one of a period before starting shaping of the three-dimensional shaped object, a period during shaping of the three-dimensional shaped object, and a period after shaping of the three-dimensional shaped object, the control unit executes, based on the setting information, for each of the shaping data,
  first processing of transmitting or not transmitting the image or the moving image to the display unit,
  second processing of activating or stopping the camera, and
  third processing of transmitting, to the display unit, output instruction information instructing whether to display the image or the moving image on the display unit.

2. The three-dimensional shaping device according to claim 1, wherein
the control unit acquires the setting information input by a user who outputs the shaping data to the three-dimensional shaping device.

3. The three-dimensional shaping device according to claim 1, wherein
one or a plurality of users are associated with each of the shaping data, and
the control unit acquires the setting information input by the user associated with the shaping data.

4. The three-dimensional shaping device according to claim 1, wherein
the control unit transmits the image to the display unit at a predetermined interval in the first processing.

5. The three-dimensional shaping device according to claim 1, wherein
the control unit causes the display unit to immediately display the image or the moving image.

6. The three-dimensional shaping device according to claim 1, wherein
the control unit transmits information including an address indicating a storage location of the image or the moving image to the display unit.

7. The three-dimensional shaping device according to claim 1, wherein
when a plurality of three-dimensional shaped objects are to be shaped in parallel based on a plurality of pieces of shaping data, the control unit executes obfuscation processing of obfuscating a region of the image or the moving image captured by the camera in which at least one three-dimensional shaped object among the plurality of three-dimensional shaped objects is captured, or transmits an instruction of executing the obfuscation processing on the region to the display unit.

8. The three-dimensional shaping device according to claim 7, wherein
the obfuscation processing includes at least one of non-display processing, conversion processing to an image unrelated to the three-dimensional shaped object, filling processing, and mosaic processing.

9. The three-dimensional shaping device according to claim 1, wherein
when an error occurs during the shaping of the three-dimensional shaped object, the control unit transmits error information to the display unit, and causes the display unit to display or store the image or the moving image captured before the occurrence of the error for a predetermined period of time.

10. A three-dimensional shaping system comprising:
a three-dimensional shaping device; and
a display device, wherein
the three-dimensional shaping device includes
  a discharge unit including a plasticizing mechanism which plasticizes at least a part of a material and configured to discharge the plasticized material toward a shaping region of a stage,
  a camera configured to capture an image of the shaping region, and
  a control unit configured to control the discharge unit based on shaping data for shaping a three-dimensional shaped object, and
when the control unit acquires setting information for setting whether to display an image or a moving image captured by the camera on the display device in at least one of a period before starting shaping of the three-dimensional shaped object, a period during shaping of the three-dimensional shaped object, and a period after shaping of the three-dimensional shaped object, the control unit executes, based on the setting information, for each of the shaping data,
  first processing of transmitting or not transmitting the image or the moving image to the display device,
  second processing of activating or stopping the camera, and
  third processing of transmitting, to the display device, output instruction information instructing whether to display the image or the moving image on the display device.

* * * * *